United States Patent [19]

Peccoux

[11] Patent Number: 4,797,439

[45] Date of Patent: Jan. 10, 1989

[54] DIORGANOPOLYSILOXANES CURABLE INTO ADHESIVE/ELASTOMERIC STATE

[75] Inventor: Pierre-Michel Peccoux, Lyon, France

[73] Assignee: Rhone-Poulenc Chimie, Courbevoie, France

[21] Appl. No.: 95,408

[22] Filed: Sep. 11, 1987

[30] Foreign Application Priority Data

Sep. 11, 1986 [FR] France .................. 86 12892

[51] Int. Cl.$^4$ ................................. C08K 5/54
[52] U.S. Cl. ........................... 524/188; 524/262; 524/267; 524/268; 524/730; 524/731; 524/492; 528/15; 528/17; 528/18; 528/33; 528/34
[58] Field of Search .......... 524/188, 262, 267, 268, 524/730, 731, 492; 528/33, 34, 17, 18, 15

[56] References Cited

U.S. PATENT DOCUMENTS 4,358,575 11/1982 Lampe et al. .............. 528/34
4,371,682 2/1983 Hashimoto et al. .......... 528/34

*Primary Examiner*—Melvyn I. Marquis
*Attorney, Agent, or Firm*—Burns, Doane, Swecker & Mathis

[57] ABSTRACT

Storage-stable diorganopolysiloxanes curable into adhesive/elastomeric state, well adapted as coatings and sealants, e.g., for adhering a wide variety of building construction materials such as glass, aluminum and PVC, are comprised of an α,ω-dihydroxydiorganopolysiloxane polymer, a ketiminoxysilane crosslinking agent therefor, and an effective amount of a tackifier which comprises a ($\Delta^2$-imidazolinyl)alkylsilane.

10 Claims, No Drawings

DIORGANOPOLYSILOXANES CURABLE INTO ADHESIVE/ELASTOMERIC STATE

BACKGROUND OF THE INVENTION

1. Field of the Invention:

The present invention relates to improved diorganopolysiloxane compositions which are stable in storage in the absence of moisture and curable into self-adhesive elastomeric state in the presence of moisture, and, more especially, to such improved compositions comprising an $\alpha,\omega$-dihydroxydiorganopolysiloxane polymer, a ketiminoxysilane crosslinking agent therefor, and a tackifying agent, or tackifier, which comprises a ($\Delta^2$-imidazolinyl)alkylsilane or a diorganopolysiloxane copolymer containing ($\Delta^2$-imidazolinyl)alkylsiloxane recurring units.

2. Description of the Prior Art:

Single-component organopolysiloxane compositions comprising a ketiminoxysilane crosslinking agent, typically also containing an inorganic filler and a curing catalyst, have long been known to this art. They are described, for example, in French Pat. Nos. 1,314,649 and 1,371,250, U.S. Pat. Nos. 3,678,003 and 3,986,999, British Pat. No. 1,468,467, Belgian Pat. No. 901,479 and European Pat. No. EP-A-157,580.

Such compositions are widely used for coating and jointing applications, and in particular as a sealant in the construction industry for producing glazed structures.

In this particular application, the cured elastomer should have a relatively low elastic modulus and should, above all, adhere strongly to glass and to the material forming the structure into which the glass is sealed, such as timber, aluminum, concrete, PVC (polyvinyl chloride), natural and synthetic rubbers, stone, earthenware and brick.

However, the elastomers produced from compositions containing a ketiminoxysilane crosslinking agent generally display inadequate adhesion to materials used in the building construction industry. Indeed, various additives to be incorporated into such compositions in order to overcome this deficiency have already been proposed to this art.

Thus, Belgian Pat. No. 901,479 proposes the use of titanium complexes, certain of which are, furthermore, claimed as crosslinking catalysts in French Pat. No. 2,531,095.

French Pat. No. 2,074,144 describes using a silane as a tackifier, each molecule of which contains at least one amino group linked to silicon by at least one carbon atom, and at least one monovalent hydrocarbon radical optionally bearing an amino or alkoxy group as a substituent and linked to the silicon via an oxygen atom. Furthermore, tackifiers are also known which are polyalkoxysilanes (see, in particular, European Pat. No. EP-A-021,859). These tackifiers are described as having no effect on the storage stability of the curable starting materials capable of yielding elastomers, without, however, being less effective.

Typical examples of this class of tackifiers are the following: $(C_2H_5O)_3Si(CH_2)_3NH_2$ or $\gamma$-aminopropyltriethoxysilane; $CH_3(C_2H_5O)_2Si(CH_2)_3NH_2$ or $\gamma$-aminopropylmethyldiethoxysilane; $(CH_3)(CH_3O)_2Si(CH_2)_3NH(CH_2)_2NH_2$ or $\beta$-aminoethyl-$\gamma$-aminopropylmethyldimethoxysilane.

Given that this class of tackifiers possesses the characteristics referred to above for the two types of compositions containing a polyalkoxysilane and ketiminoxysilane crosslinking agent, one skilled in this art would conclude that all the tackifiers described earlier for use with one type would also be adapted for use with the other type, as, for example, the silane of the formula:

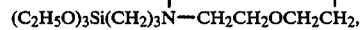

$(C_2H_5O)_3Si(CH_2)_3N$—$CH_2CH_2OCH_2CH_2$, or $\gamma$-morpholinopropyltriethoxysilane, described as a tackifier for compositions containing a polyalkoxysilane crosslinking agent in French Pat. No. 2,572,415.

However, as is shown in the comparative examples below, it appears that the tackifiers of the prior art have at least one of the following disadvantages, in compositions containing a ketiminoxysilane crosslinking agent:

1. the storage stability of the compositions is adversely affected by the presence of the tackifier;
2. the crosslinking of the compositions into an elastomer is too slow, particularly at ambient temperature;
3. the tackifier does not render the elastomer sufficiently adhesive; and
4. the physical properties of the elastomer are mediocre or clearly inadequate, in particular for jointing applications.

SUMMARY OF THE INVENTION

Accordingly, a major object of the present invention is the provision of improved tackifiers for incorporation into organopolysiloxane compositions containing a ketiminoxysilane crosslinking agent, and which improved tackifiers conspicuously ameliorate those disadvantages and drawbacks to date characterizing the state of this art.

Briefly, the present invention features diorganopolysiloxane compositions which are stable in storage in the absence of moisture and curable into elastomeric state in the presence of moisture, said compositions comprising:

(A) 100 parts by weight of at least one $\alpha,\omega$-dihydroxydiorganopolysiloxane polymer having a viscosity of 700 to 1,000,000 mPa.s at 25° C., and which comprises a sequence of diorganosiloxy recurring units of the formula $T_2SiO$ in which the radicals T, which are identical or different, denote hydrocarbon radicals containing from 1 to 10 carbon atoms, at least 50% of the number of the radicals T being methyl groups;

(B) 0.5 to 20 parts by weight of at least one ketiminoxysilane crosslinking agent;

(C) 0.1 to 20 parts by weight of a tackifier selected from among:

($C_1$) a silane of the formula:

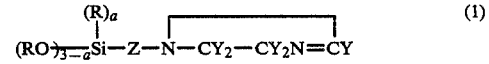

$$(RO)_{3-a}Si-Z-N-CY_2-CY_2N=CY \quad (1)$$

with $(R)_a$ on the Si.

in which:

the radicals R, which are identical or different, are $C_1$–$C_{12}$, preferably $C_1$–$C_4$, alkyl radicals; the radicals Y, which are identical or different, are a radical R or a hydrogen atom;

Z is a straight or branched chain divalent $C_2$–$C_{12}$, preferably $C_2$–$C_5$, aliphatic hydrocarbon radical; and a is 0, 1 or 2; or ($C_2$) a diorganopolysiloxane copolymer which comprises a sequence of $T_2SiO$ recurring units as defined under (A) and including at least one siloxane recurring unit of the formula:

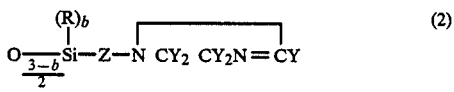

in which:

is 1 or 2 and R, Z and Y are as defined under (C₁);

(D) 0 to 250 parts by weight of inorganic filler material; and (E) 0 to 3 parts by weight of a curing catalyst.

DETAILED DESCRIPTION OF THE PREFERRED EMBODIMENTS OF THE INVENTION

More particularly according to the present invention, the silanes (C₁) and the diorganopolysiloxanes (C₂), as well as processes for the preparation thereof, are described in French Pat. Nos. 1,360,395, 1,387,337 and 1,467,679, for example, as antistatic agents which can be applied as finishes onto various organic substrates, including synthetic fibers.

Another known use of the silanes (C₁) is for the assembly of laminated safety glass onto sheets of plasticized synthetic material at a high temperature, as described in French Patents Nos. 2,330,658 and 2,369,225. Such known uses of the compounds (C₁) and (C₂) are conspicuously remote from the present invention.

Because of its commercial availability, it is most particularly preferred to employ, as silane (C₁), the silane of the formula:

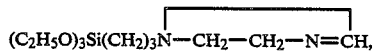

or γ-(Δ²-imidazolinyl)propyltriethoxysilane.

Other silanes (C₁) can also be employed, such as those of the formulae:

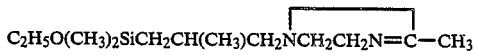

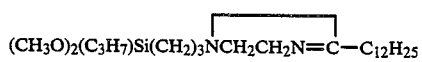

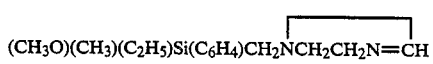

The α,ω-di(hydroxy)diorganopolysiloxane polymers (A) having a viscosity of 700 to 1,000,000 mPa.s at 25° C., preferably from 1,000 to 700,000 mPa.s at 25° C., are linear polymers comprising diorganosiloxy recurring units of the aforementioned formula T₂SiO and blocked with a hydroxyl group at each end of their polymer chain; however, the presence of monoorganosiloxy recurring units of the formula TSiO₁.₅ and/or of siloxy recurring units of the formula SiO₂ is within the ambit of the invention, in a proportion not exceeding 2% based on the number of diorganosilxy recurring units.

The hydrocarbon radicals containing from 1 to 10 carbon atoms, whether unsubstituted or substituted by halogen atoms or cyano groups, which are denoted by the symbols T, include:

(i) alkyl and haloalkyl radicals containing from 1 to 10 carbon atoms, such as methyl, ethyl, propyl, isopropyl, butyl, pentyl, hexyl, 2-ethylhexyl, octyl, decyl, 3,3,3trifluoropropyl, 4,4,4-trifluorobutyl and 4,4,4,3,3-pentafluorobutyl radicals;

(ii) cycloalkyl and halocycloalkyl radicals containing from 1 to 10 carbon atoms, such as cyclopentyl, cyclohexyl, methylcyclohexyl, propylcyclohexyl, 2,3-difluorocyclobutyl and 3,4-difluoro-5-methylcycloheptyl radicals;

(iii) alkenyl radicals containing from 2 to 4 carbon atoms, such as vinyl, allyl and 2-butenyl radicals;

(iv) mononuclear aryl and haloaryl radicals containing from 6 to 10 carbon atoms, such as phenyl, tolyl, xylyl, chlorophenyl, dichlorophenyl and trichlorophenyl radicals; and (v) cyanoalkyl radicals, the alkyl moieties of which contain from 2 to 3 carbon atoms, such as β-cyanoethyl and γ-cyanopropyl radicals; methyl, phenyl, vinyl and 3,3,3-trifluoropropyl radicals are the preferred radicals.

Exemplary of recurring units of the formula T₂SiO, representative are those of the formulae:

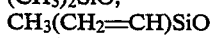
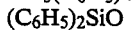
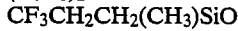
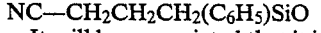

It will be appreciated that it is intended that a mixture of α,ω-di(hydroxy)diorganopolysiloxane polymers which differ from each other in molecular weight and/or the nature of the groups linked to the silicon atoms may be used as the polymer (A).

These α,ω-di(hydroxy)diorganopolysiloxane polymers (A) are readily commercially available; in addition, they are easily produced according to methods which are now well known to this art.

It is desirable that these polymers be used after they have been devolatilized, for example, using the devolatilization process described in U.S. Pat. No. 4,356,116.

The crosslinking agents (B) are used in a proportion of 0.5 to 20 parts by weight, preferably 1 to 18 parts by weight, per 100 parts by weight of α,ω-di(hydroxy)diorganopolysiloxane polymers (A). These are organosilicon compounds bearing more than two hydrolyzable ketiminoxy radicals per molecule, which radicals are bonded to the silicon atoms thereof.

The crosslinking agent preferably corresponds to the general formula:

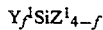

in which:

the symbol $Y^1$ denotes a $C_1$–$C_{10}$ hydrocarbon radical, whether unsubstituted or substituted by halogen atoms or cyano groups;

the symbols $Z^1$, which are identical or different, denote hydrolyzable radicals of the formulae:

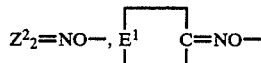

which:

the symbols $Z^2$, which are identical or different, denote $C_1$–$C_8$ hydrocarbon radicals and the symbol $E^1$ denotes a $C_4$–$C_8$ alkylene radical, and the symbol f denotes zero or 1.

The symbol $Y^1$ may have the same meaning as the symbol T in the above recurring units of the formula $T_2SiO$; thus, the illustration given in the case of T is also applicable to $Y^1$.

The symbols $Z^2$ may thus denote $C_1$–$C_8$ hydrocarbon radicals including, in particular:

(i) $C_1$–$C_8$ alkyl radicals such as methyl, ethyl, propyl, isopropyl, butyl, isobutyl, 2-ethylhexyl and octyl radicals;

(ii) $C_2$–$C_4$ alkenyl radicals such as vinyl, allyl and 2-butenyl radicals;

(iii) $C_5$–$C_8$ cycloalkyl radicals such as cyclopentyl, cyclohexyl and methylcyclohexyl radicals; and (iv) mononuclear $C_6$–$C_8$ aryl radicals such as phenyl, tolyl and xylyl radicals.

The symbol $E^1$ denotes a $C_4$–$C_8$ alkylene radical which may correspond to the formulae: —(CH$_2$)$_4$—, —(CH$_2$)$_5$—, —(CH$_2$)$_6$—, —(CH$_2$)$_7$—, —CH$_2$—CH(C$_2$H$_5$)(CH$_2$)$_3$— and CH$_2$—CH$_2$—CH(CH$_3$)CH$_2$CH$_2$—.

Exemplary of the silanes (B), representative are the silanes of the formulae:

CH$_3$Si[ON=C(CH$_3$)$_2$]$_3$, CH$_3$Si[On=C(CH$_3$)C$_2$H$_5$]$_3$,
CH$_2$=CHSi[ON=C(CH$_3$)C$_2$H$_5$]$_3$,
C$_6$H$_5$Si[ON=C(CH$_3$)$_2$]$_3$,
CH$_3$Si[ON=C(C$_2$H$_5$)(CH$_2$)$_3$CH$_3$]$_3$,
CH$_3$Si[ON=C(CH$_3$)CH(C$_2$H$_5$)(CH$_2$)$_3$CH$_3$]$_2$,
(CH$_3$)$_2$C=NOSi[ON=C(CH$_3$)C$_2$H$_5$]$_3$,

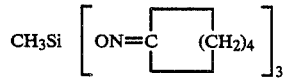

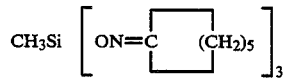

The inorganic or mineral fillers (D) are employed in a proportion of 0 to 250 parts by weight, preferably 5 to 200 parts by weight, per 100 parts by weight of the α,ω-di(hydroxy)diorganopolysiloxane polymers (A).

These fillers may be in the form of very finely divided materials whose mean particle size is below 0.1 micrometer. These fillers include pyrogenic silicas and precipitated silicas; their BET specific surface area is generally greater than 40 m$^2$/g.

These fillers may also be in the form of more coarsely divided materials, with a mean particle diameter greater than 0.1 micrometer. Exemplary of such fillers, representative are ground quartz, diatomaceous silicas, treated or untreated calcium carbonate, calcined clay, rutile-type titanium dioxide, iron, zinc, chromium, zirconium and magnesium oxides, the various forms of alumina (hydrated or not), boron nitride, lithopone, barium metaborate, barium sulfate and ballotini; their specific surface area is generally below 30 m$^2$/g.

These fillers (D) may have been surface-modified by treatment with the various organosilicon compounds usually employed for this purpose. Thus, the organosilicon compounds may be organochlorosilanes, diorganocyclopolysiloxanes, hexaorganodisiloxanes, hexaorganodisilazanes or diorganocyclopolysiloxanes (French Pat. Nos. 1,126,884, 1,136,885 and 1,236,505, British Pat. No. 1,024,234). In most cases, the treated fillers contain from 3 to 30% of their weight of organosilicon compounds.

The fillers (D) may be a mixture of several types of fillers of different particle sizes; thus, for example, they may comprise 5 to 95% of finely divided silicas having a BET specific surface area greater than 40 m$^2$/g and 95 to 5% of more coarsely divided silicas having a specific surface area below 30 m$^2$/g, or treated or untreated calcium carbonate.

The compositions preferably contain a catalyst (E), which advantageously is a compound of a metal selected, in general, from among tin, iron, titanium and zirconium.

In general, from 0.0004 part to 3 parts by weight of (E) are employed per 100 parts by weight of (A).

Insofar as tin is concerned, the most widely used catalysts are dialkyltin dicarboxylates, especially dibutyltin dilaurate and diacetate (Noll's text, Chemistry and Technology of Silicones, page 337), and dibutyltin diversatates (French Pat. No. 2,066,159).

It is also possible to use the reaction products of dialkyltin dicarboxylates with polyalkoxysilanes or alkylpolysilicates (U.S. Pat. Nos. 3,186,963 and 3,862,919 and Belgian Pat. No. 842,305).

Tin chelates may also be used, as described in European Pat. No. EP-A-147,323.

Insofar as titanium and zirconium catalysts are concerned, those described in European Pat. No. EP-A-102,268 may be used.

In addition to the constituents (A) to (E) described above, the compositions according to the invention may contain other ingredients.

These ingredients include organosilicon compounds, chiefly polymers, which are capable of positively affecting the physical characteristics of the compositions according to the invention and/or the mechanical properties of the silicone elastomers produced therefrom.

These compounds are well known; they include, for example:

(i) α,ω-bis(triorganosiloxy)diorganopolysiloxane polymers having a viscosity of at least 10 mPa.s at 25° C., in which the organic radicals bonded to the silicon atoms are methyl, vinyl and phenyl radicals; α,ω-bis(trimethylsiloxy)dimethylpolysiloxane oils having a viscosity of 10 mPa.s at 5° C. to 1,500 mPa.s at 25° C. are preferably used;

(ii) branched, liquid, methylpolysiloxane polymers containing from 0.1 to 8% of hydroxyl groups bonded to the silicon atoms, comprising (CH$_3$)$_3$SiO$_{0.5}$, (CH$_3$)$_2$SiO, and CH$_3$SiO$_{1.5}$ recurring units distributed such as to provide a (CH$_3$)$_3$SiO$_{0.5}$/(CH$_3$)$_2$SiO ratio of 0.01 to 0.15 and a CH$_3$SiO$_{1.5}$/(CH$_3$)$_2$SiO ratio of 0.1 to 1.5;

(iii) α,ω-di(hydroxy)dimethylpolysiloxane oils having a viscosity of 10 to 300 mPa.s at 25° C. and α,ω-di(hydroxy)methylphenylpolysiloxane oils having a viscosity of 200 to 1,000 mPa.s at 25° C.; and (iv) diphenylsilanediol and 1,1,3,3-tetramethyldisiloxanediol.

The above α,ω-bis(triorganosiloxy)diorganopolysiloxane polymers may be completely or partially replaced with organic compounds which are inert towards the various constituents of the bases and are miscible at least with the diorganopolysiloxane polymers (A). Exemplary of these organic compounds, representative are the polyalkylbenzenes produced by alkylation of benzene with longchain olefins, especially olefins containing 12 carbon atoms produced by the polymerization of propylene. Organic compounds of this type are described, for example, in French Pat. Nos. 2,392,476 and 2,446,849; each of the above organosilicon compounds may be employed in a proportion of 1 to 150 parts by weight, preferably 3 to 100 parts by weight, per 100 parts by weight of the diorganopolysiloxanes (A).

Ingredients which are not organosilicon compounds may also be added, for example, heat stabilizers. These compounds improve the heat resistance of the silicone elastomers. They may comprise salts of carboxylic acids, rare earth oxides and hydroxides, and more especially ceric oxides and hydroxides, as well as pyrogenic titanium dioxide and the various iron oxides. From 0.1 to 15 parts by weight, preferably from 0.15 to 12 parts by weight of heat stabilizers are advantageously used per 100 parts by weight of the diorganopolysiloxanes (A).

In order to formulate the compositions according to the invention, it is necessary, in the case of the single-component compositions, to use an apparatus which permits the various basic constituents, to which the abovementioned adjuvants and additives are added, if desired, to be intimately admixed in the absence of moisture, with and without the application of heat.

All these ingredients may be charged into the apparatus in any order of addition whatever. Thus, it is possible to mix the diorganopolysiloxane polymers (A), the tackifier (C) and the fillers (D) first and then to add the crosslinking agents (B) and the catalyst (E) to the base dough.

It is also possible to mix the polymers (A) and the crosslinking agents (B) and to subsequently add the fillers (D), the tackifier (C) and the catalyst (E). During these operations, the mixtures may be heated to a temperature in the range of 50°-180° C. at atmospheric pressure, or at a reduced pressure in order to promote the removal of volatile materials such as water and low molecular weight polymers.

In order to further illustrate the present invention and the advantages thereof, the following specific examples are given, it being understood that same are intended only as illustrative and in nowise limitative. In said examples to follow, all parts and percentages are given by weight, unless otherwise indicated.

EXAMPLES 1 AND 2 AND COMPARATIVE EXAMPLES 3 TO 8

(unaged compositions)

The following materials were homogenized under substantially anhydrous conditions at 80° C. in blender with a three-bladed stirrer:

60 parts of an α,ω-dihydroxypolydimethylsiloxane oil having a viscosity of 70,000 mPa.s at 25° C.;

40 parts of an α,ω-dihydroxypolydimethylsiloxane oil having a viscosity of 3,500 mPa.s at 25° C.; and 26 parts of a polydimethylsiloxane oil blocked with a trimethylsiloxy unit at each end of its polymer chain, having a viscosity of 1,000 mPa.s at 25° C.

The mixture was subjected to very powerful stirring (450 revolutions/min) for 5 minutes and the following were added in succession:

a mixture of 4 parts of methyltris(methylethyl)ketoximesilane and 4 parts of vinyltris(methylethylketoxime)silane, the formulae of which are, respectively:

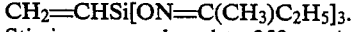

$CH_3Si[ON=C(CH_3)C_2H_5]_3$ and
$CH_2=CHSi[ON=C(CH_3)C_2H_5]_3$.

Stirring was reduced to 250 rev/min and 16 parts of pyrogenic silica having a BET specific surface area of 150 m²/g were added, followed by 0.04 g of dibutyltin bisacetylacetonate.

Various tackifiers were then added in equimolar amounts.

The compositions were devolatilized for 3 minutes at 1.33 kPa, cooled to 20° C. and then stored in the absence of air.

Various measurements were conducted on each composition containing different tackifiers, in order to assess the reactivity and the storage stability, as well as the physical properties of the resultant elastomers produced therefrom.

A first fraction was spread out at ambient temperature (25° C., 50% relative humidity) to form a layer 2 mm in thickness on a polyethylene plaque previously coated with a commercial detergent. The time, in minutes, at which a tack-free touch was obtained (T.F.P.) was then assessed.

The Shore A hardness was measured on 2- or 7-day old film, at 2 days (SAH 2 d) and 7 days (SAH 7 d) according to the standard NF-T-51 109.

The following were measured on 7-day old film:

(i) The breaking strength (BS) in MPa according to standard NF-T-46 002;

(ii) The elongation at break (EB) in % according to standard NF-T-46 002;

(iii) The modulus (YM) in MPa at 100% elongation.

Evaluation of adhesion

Another fraction of the composition was employed to produce test specimens according to ASA standard 116-1-1960.

Two 50-mm sided square plaques consisting of the material, the adhesion of which to the composition cured to an elastomer was to be measured, were placed face-to-face 12 mm apart. The space formed between the two plaques was then filled completely with wooden wedges, except for the middle portion of this space, such as to define a cavity, 50×12×12 mm in size, extending from one edge of the plaque to the other. This cavity was filled with the composition, the assembly maintained for 28 days at ambient temperature, and the wedges were removed to release the test specimen. The latter thus consisted of two plaques of the same material which were bonded together along one of their median lines by a parallelepipedal bar of elastomer.

The test specimens produced in this manner were divided into four batches of equal size, the test specimens forming each batch differing from each other in the nature of the plaque material, namely glass, aluminum, polyvnyl chloride (PVC) and concrete.

The breaking strength (BS) in MPa and the elongation at break (EB) in % were measured as recommended in ASA standard 116-1-1960.

The breaks produced are described as cohesive (COH), if they occurred within the mass of the elastomer bar. They are described as adhesive (ADH), if the break occurred by separation of the bar at its regions of contact with the plaques.

The results obtained are reported in Table I below. The definitions of the symbols denoting the various tackifiers are as follows:

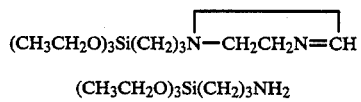

A:

(CH$_3$CH$_2$O)$_3$Si(CH$_2$)$_3$NH$_2$  B:

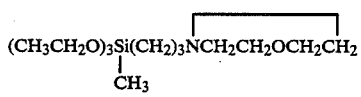

C:

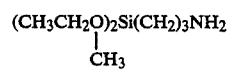

D:

(CH$_3$O)$_2$Si(CH$_2$)$_3$NH(CH$_2$)$_2$NH$_2$  E:

accelerated aging for 24 hours at 100° C. under anhydrous conditions was employed to produce the films.

Crosslinking of the film occurred at 25° C.

The results obtained are reported in Table II below:

TABLE II

| TACK-FIER | Example | T.F.P. min | SAH 2D | SAH 7D | BS MPa | EB % | YM MPa |
|---|---|---|---|---|---|---|---|
| A | 9 | 10 | 21 | 24 | 1.60 | 425 | 0.59 |
|   | 10 | 10 | 22/23 | 25 | 1.37 | 449 | 0.45 |
| B | 11 | 15 | 22 | 25 | 1.38 | 372 | 0.58 |
|   | 12 | 10 | 24 | 26 | 1.39 | 406 | 0.49 |
| C | 13 | 10 | 21 | 21 | 1.62 | 414 | 0.52 |
|   | 14 | 10 | 18 | 22 | 1.41 | 408 | 0.45 |
| D | 15 | 10 | 20 | 22 | 1.51 | 418 | 0.54 |
| E | 16 | 10 | 21 | 21 | 1.63 | 431 | 0.61 |

EXAMPLES 17 AND 18 AND COMPARATIVE EXAMPLES 19 TO 24: (compositions aged 2 days at 100° C., crosslinking at 25° C.)

The procedures of Examples 1 to 8 were again repeated, except that a composition which had been subjected to accelerated aging for 48 hours at 100° C. under anhydrous conditions was employed to produce the films. Crosslinking of the film and of the test specimens occurred at 25° C.

TABLE I

| TACKIFIER | Ex. | T.F.P. min | SAH 2D | SAH 7D | BS MPa | EB % | YM MPa | GLASS BS MPa | GLASS EB % | ALUMINUM BS MPa | ALUMINUM EB % | PVC BS MPa | PVC EB % | CONCRETE BS MPa | CONCRETE EB % |
|---|---|---|---|---|---|---|---|---|---|---|---|---|---|---|---|
| A (1.25 parts) | 1 | 10 | 24 | 26 | 2.02 | 424 | 0.63 | 0.50 COH. | 81 | 0.43 COH. | 80 | 0.54 COH. | 60 | 0.50 COH/ADH | 60 |
|   | 2 | 15 | 25 | 27 | 2.07 | 486 | 0.64 | 0.65 COH. | 95 | 0.59 COH. | 75 | 0.61 COH. | 87 | 0.64 ADH. | 46 |
| B (1 part) | 3 | 10 | 24 | 26 | 2.01 | 364 | 0.68 | 0.44 COH. | 66 | 0.78 COH. | 66 | 0.30 ADH. | 34 | 0.45 ADH. | 57 |
|   | 4 | 10 | 26 | 28 | 1.96 | 457 | 0.62 | 0.59 COH. | 71 | 0.77 COH. | 93 | 0.44 ADH. | 59 | 0.43 ADH. | 39 |
| C (1.3 parts) | 5 | 15 | 24 | 26 | 1.98 | 460 | 0.58 | 0.41 ADH. | 27 | 0.21 ADH. | 17 | 0.09 ADH. | 17 | 0.40 | 37 |
|   | 6 | 15 | 23 | 25 | 2.14 | 509 | 0.60 | 0.25 | 20 | 0.22 | 18 | 0.12 | 22 | 0.37 | 31 |
| D (0.85 parts) | 7 | 15 | 25 | 26 | 2.13 | 401 | 0.68 | 0.27 ADH. | 20 | 0.40 ADH. | 78 | 0.17 ADH. | 15 | 0.40 ADH. | 37 |
| E (0.95 parts) | 8 | 10 | 24 | 24 | 2.17 | 345 | 0.66 | 0.45 ADH. | 70 | 0.40 ADH. | 66 | 0.33 ADH. | 38 | 0.10 ADH. | 10 |

EXAMPLES 9 AND 10 COMPARATIVE EXAMPLES 11 TO 16: (compositions aged 1 day at 10° C.)

The procedures of Examples 1 to 8 were repeated, except that a composition which had been subjected to The results obtained are reported in Table III below:

TABLE III

| TACKIFIER | Ex. | T.F.P. min | SAH 2D | SAH 7D | BS MPa | EB % | YM MPa | GLASS BS MPa | GLASS EB % | ALUMINUM BS MPa | ALUMINUM EB % | PVC BS MPa | PVC EB % | CONCRETE BS MPa | CONCRETE EB % |
|---|---|---|---|---|---|---|---|---|---|---|---|---|---|---|---|
| A | 17 | 10 | 19 | 24 | 1.34 | 451 | 0.50 | 0.50 COH. | 50 | 0.48 COH. | 63 | 0.44 COH. | 64 | 0.40 COH/ADH | 43 |
|   | 18 | 15 | 20/21 | 24 | 1.37 | 537 | 0.42 | 0.48 COH. | 112 | 0.44 COH. | 81 | 0.45 COH. | 101 | 0.39 ADH. | 59 |
| B | 19 | 15 | 20 | 20 | 1.27 | 351 | 0.52 | 0.48 COH. | 63 | 0.44 COH. | 68 | 0.40 COH. | 78 | 0.34 ADH. | 33 |
|   | 20 | 12 | 20 | 23 | 1.18 | 351 | 0.41 | 0.42 COH. | 63 | 0.49 COH. | 92 | 0.42 ADH. | 68 | 0.32 ADH. | 42 |
| C | 21 | 15 | 17 | 20 | 1.36 | 458 | 0.46 | 0.27 COH. | 31 | 0.18 COH. | 18 | 0.45 COH. | 52 | 0.28 ADH. | 43 |
|   | 22 | 15 | 15 | 20 | 1.39 | 447 | 0.39 | 0.39 COH. | 88 | 0.48 COH. | 103 | 0.46 COH. | 56 | 0.22 ADH. | 28 |
| D | 23 | 10 | 19 | 19 | 1.31 | 360 | 0.48 | 0.42 | 53 | 0.43 | 59 | 0.45 | 60 | 0.27 | 44 |

TABLE III-continued

| | | MECHANICAL PROPERTIES | | | | | ADHESION | | | | | | | | |
| | | | | | | | GLASS | | ALUMINUM | | PVC | | CONCRETE | |
| TACKIFIER | Ex. | T.F.P. min | SAH 2D | SAH 7D | BS MPa | EB % | YM MPa | BS MPa | EB % | BS MPa | EB % | BS MPa | EB % | BS MPa | EB % |
| E | 24 | 10 | 20 | 20 | 1.27 | 348 | 0.54 | COH. 0.44 COH. | 60 | ADH. 0.44 COH/ADH | 63 | ADH. 0.45 ADH. | 70 | ADH. 0.5 ADH. | 83 |

EXAMPLES 25 AND 26 AND COMPARATIVE EXAMPLES 27 TO 32: (crosslinking at 0° C. on unaged compositions and those aged for 48 hours at 100° C.)

The procedures of Examples 1 to 8 were again repeated, except that an unaged composition or one which had been subjected to accelerated aging for 4 hours at 100° C. was employed to produce the films. Crosslinking occurred at 0° C.

The results obtained are reported in Table IV below:

TABLE IV

| | | STARTING COMPOSITIONS | | | COMPOSITIONS AGED 2D/100° C. | | |
| TACKIFIER | Example | BS MPa | EB % | YM | BS | EB | YM |
| A | 25 | 1.05 | 755 | 0.28 | 0.34 | 448 | 0.16 |
| | 26 | 1.02 | 782 | 0.24 | 0.32 | 437 | 0.14 |
| B | 27 | 0.84 | 640 | 0.27 | 0.23 | 324 | 0.13 |
| | 28 | 0.77 | 622 | 0.25 | 0.27 | 348 | 0.14 |
| C | 29 | no mechanical properties | | | no mechanical properties | | |
| | 30 | | | | | | |
| D | 31 | 0.71 | 598 | 0.20 | — | — | — |
| E | 32 | 0.65 | 628 | 0.20 | — | — | — |

From Tables I to IV it is apparent that, in aged or unaged compositions after crosslinking at 25° C., the tackifier A presented the best stability/reactivity/adhesion compromise. The superiority of the tackifier A where the stability/reactivity/mechanical properties compromise is concerned was still more apparent in the case of the compositions crosslinked at 0° C. and either aged or unaged.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A storage-stable diorganopolysiloxane composition of matter curable into elastomeric state, comprising an α,ω-dihydroxydiorganopolysiloxane polymer, a ketiminoxysilane crosslinking agnet therefor, and a tackifier which comprises a ($\Delta^2$-imidazolinyl)alkylsilane in an amount effective to enhance adhesion of the composition.

2. The diorganopolysiloxane composition as defined by claim 1, comprising:

(A) 100 parts of at least one α,ω-dihydroxydioranopolysiloxane polymer having a viscosity of 700 to 1,000,000 mPa.s at 25° C., including a sequence of diorganosiloxy recurring units of the formula $T_2SiO$, in which the radicals T, which are identical or different, are hydrocarbon radicals containing from 1 to 10 carbon atoms, at least 50% of the number of the radicals T being methyl radicals;

(B) 0.5 to 20 parts of at least one ketiminoxysilane crosslinking agent;

(C) 0.1 to 20 parts of a ($\Delta^2$-imidazolinyl)alkylsilane tackifier of the formulae:

(C$_1$) a silane of the formula:

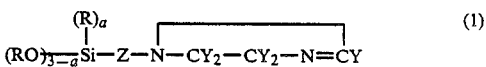

in which the radicals R, which are identical or different, are $C_1$–$C_{12}$ alkyl radicals; the radicals Y, which are identical or different, are each a radical R or a hydrogen atom; Z is a straight or branched chain $C_2$–$C_{12}$ divalent aliphatic hydrocarbon radical; and a is 0, 1 or 2, or (C$_2$) a diorganopolysiloxane copolymer including a sequence of recurring units $T_2SiO$ as defined under A and comprising at least one siloxane recurring unit of the formula:

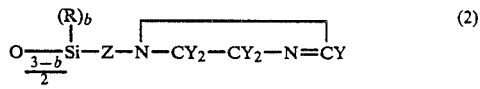

in which b is 1 or 2 and R, Z and Y are as defined under (C$_1$);

(D) 0 to 250 parts of inorganic filler material; and
(E) 0 to 3 parts of a curing catalyst.

3. The diorganopolysiloxane composition as defined by claim 2, said tackifier (C) comprising a silane (C$_1$).

4. The diorganopolysiloxane composition as defined by claim 2, said tackifier (C) comprising a diorganopolysiloxane copolymer (C$_2$).

5. The diorganopolysiloxane composition as defined by claim 2, said crosslinking agent (B) having the formula:

in which $Y^1$ is a $C_1$–$C_{10}$ hydrocarbon radical or a substituted such radical bearing at least one halogen atom or cyano substituent; the radicals $Z^1$, which may be identical or different, are hydrolyzable radicals of the formulae:

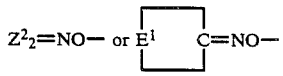

in which the radicals $Z^2$, which may be identical or different, are $C_1$–$C_8$ hydrocarbon radicals and $E^1$ is a $C_4$–$C_8$ alkylene radical; and f is zero or 1.

6. The diorganopolysiloxane composition as defined by claim 2, further comprising an α,ω-bis(triorganosiloxy)diorganopolysiloxane polymer, a branched, liquid methylpolysiloxane polymer, an α,ω-di(hydroxy)dimethylpolysiloxane oil, diphenylsilanediol and/or 1,1,3,3-tetramethyldisiloxanediol.

7. The diorganopolysiloxane composition as defined by claim 2, said tackifier (C) comprising γ-($\Delta^2$imidazolinyl)propyltriethoxysilane.

8. The diorganopolysiloxane composition as defined by claim 1, in cured elastomeric state.

9. A shaped article comprising the elastomeric diorganopolysiloxane as defined by claim 8.

10. The shaped article as defined by claim 9, comprising a seal.

* * * * *